Oct. 19, 1943.  M. C. TATE  2,331,871
WEIGHING AND INDICATING APPARATUS
Filed May 24, 1941   5 Sheets-Sheet 1

INVENTOR
MALCOLM C. TATE
BY

Oct. 19, 1943.    M. C. TATE    2,331,871
WEIGHING AND INDICATING APPARATUS
Filed May 24, 1941   5 Sheets-Sheet 2
Fig. 2
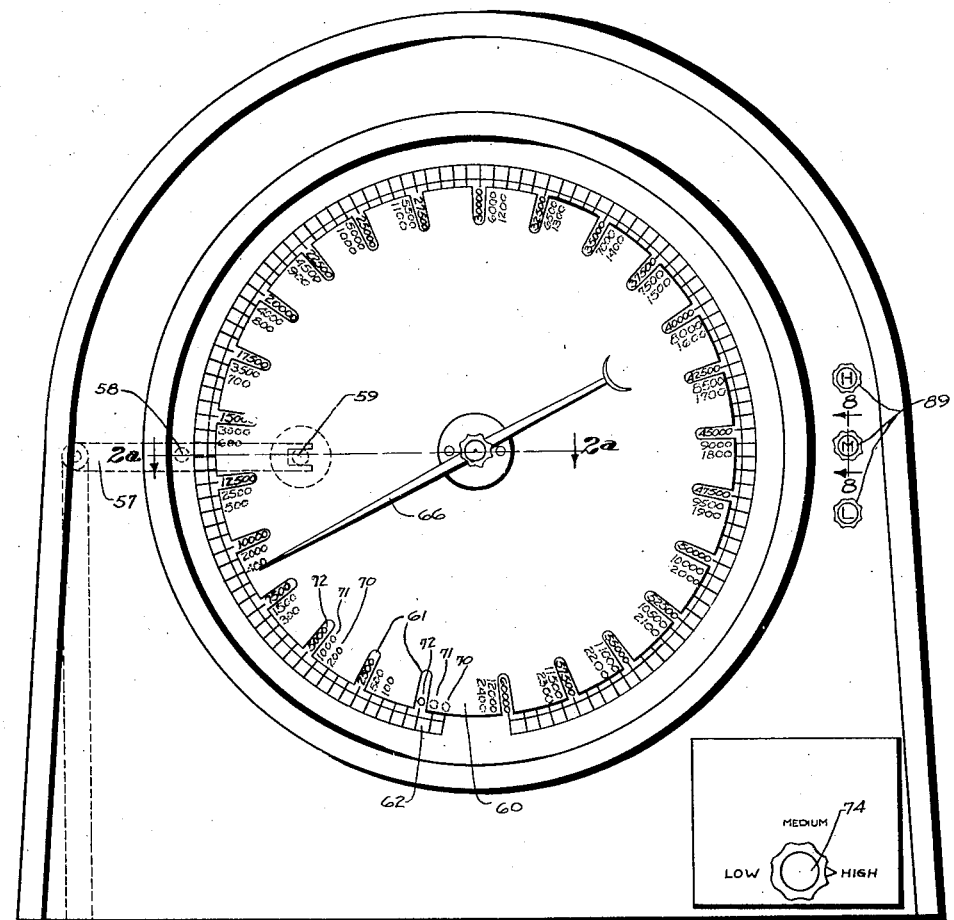
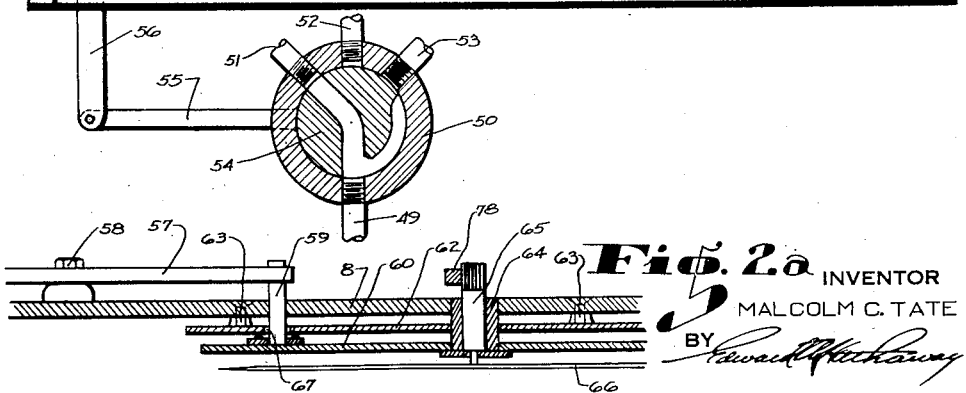
Fig. 2a
INVENTOR
MALCOLM C. TATE
BY Oct. 19, 1943.    M. C. TATE    2,331,871
WEIGHING AND INDICATING APPARATUS
Filed May 24, 1941    5 Sheets-Sheet 3

INVENTOR
MALCOLM C. TATE
BY

Oct. 19, 1943.   M. C. TATE   2,331,871
WEIGHING AND INDICATING APPARATUS
Filed May 24, 1941   5 Sheets-Sheet 4

INVENTOR
MALCOLM C. TATE

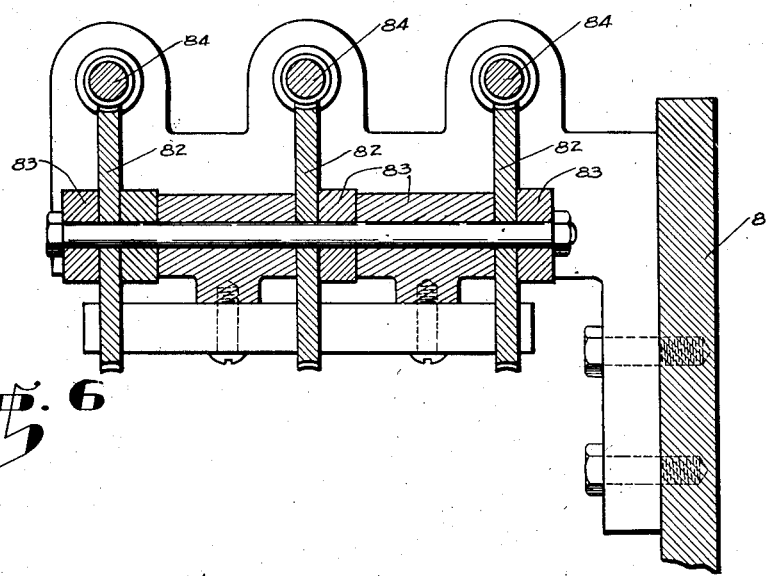
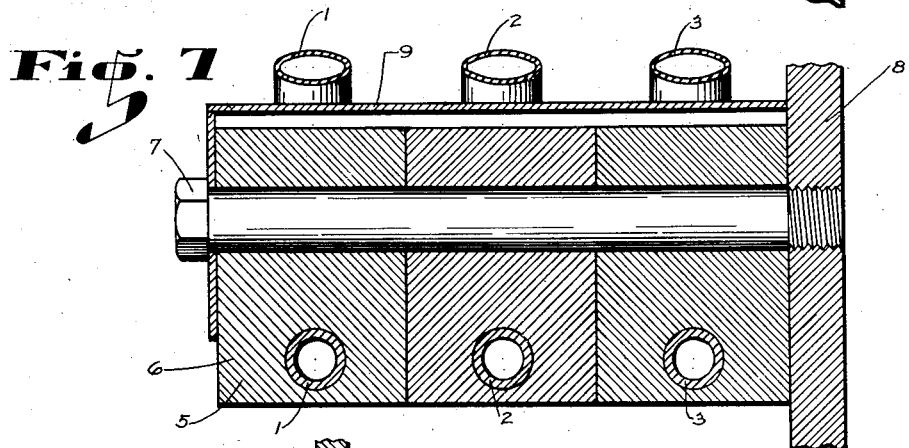
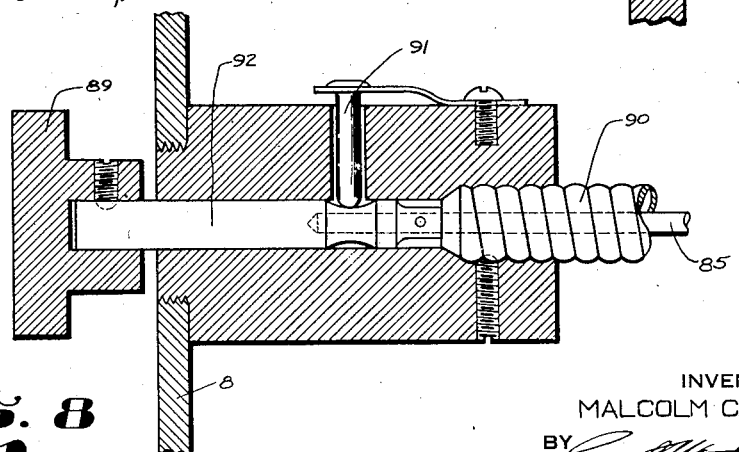

Patented Oct. 19, 1943

2,331,871

UNITED STATES PATENT OFFICE 2,331,871

WEIGHING AND INDICATING APPARATUS

Malcolm C. Tate, Stamford, Conn., assignor to
The Baldwin Locomotive Works, a corporation
of Pennsylvania Application May 24, 1941, Serial No. 394,962

9 Claims. (Cl. 265—47)

This invention relates generally to weighing and indicating mechanism and more particularly to a multiple load weighing and indicating apparatus that is especially applicable to materials testing machines.

The general type of load weighing and indicating mechanism disclosed herein is illustrated and described more particularly in my Patent No. 2,212,085 and in my copending application Serial No. 317,286, filed February 5, 1940. In said copending application multiple load ranges are obtained in a manner that requires a particular coordinated adjustability of one of the load responsive elements and of the load indicating dial in order to obtain a proper zero reading for each load range. In addition, my prior arrangements have been restricted as to the number of load ranges that could be conveniently and compactly obtained.

It is an object of my invention to provide an improved multiple load range weighing and indicating system. A further object is to provide an improved weighing and indicating system whereby the zero position of the indicating system may be adjusted in a simple, sensitive and accurate manner, and a further object in this respect is to provide an improved zero position adjusting means that is especially applicable for effecting a zero position for each range of a multiple load range weighing and indicating system. Still another object is to provide improved means whereby a plurality of load responsive elements for different load ranges may be employed in a convenient and compact arrangement while employing a common servo-motor in controlling a null method operation of said load responsive means.

Other objects and advantages will be more apparent to those skilled in the art from the following description of the accompanying drawings in which:

Fig. 2 is a front view of the indicating system showing means for shifting the indicating system from one load range to the other automatically in accordance with which each load range is selected;

Fig. 2a is a section taken on the line 2a—2a of Fig. 2;

Fig. 6 is a section taken substantially on the line 6—6 of Fig. 1;

Fig. 7 is a section taken substantially on the line 7—7 of Fig 1; and

Fig. 8 is a section taken substantially on the lines 8—8 of Figs. 1 and 2.

Figure 1:
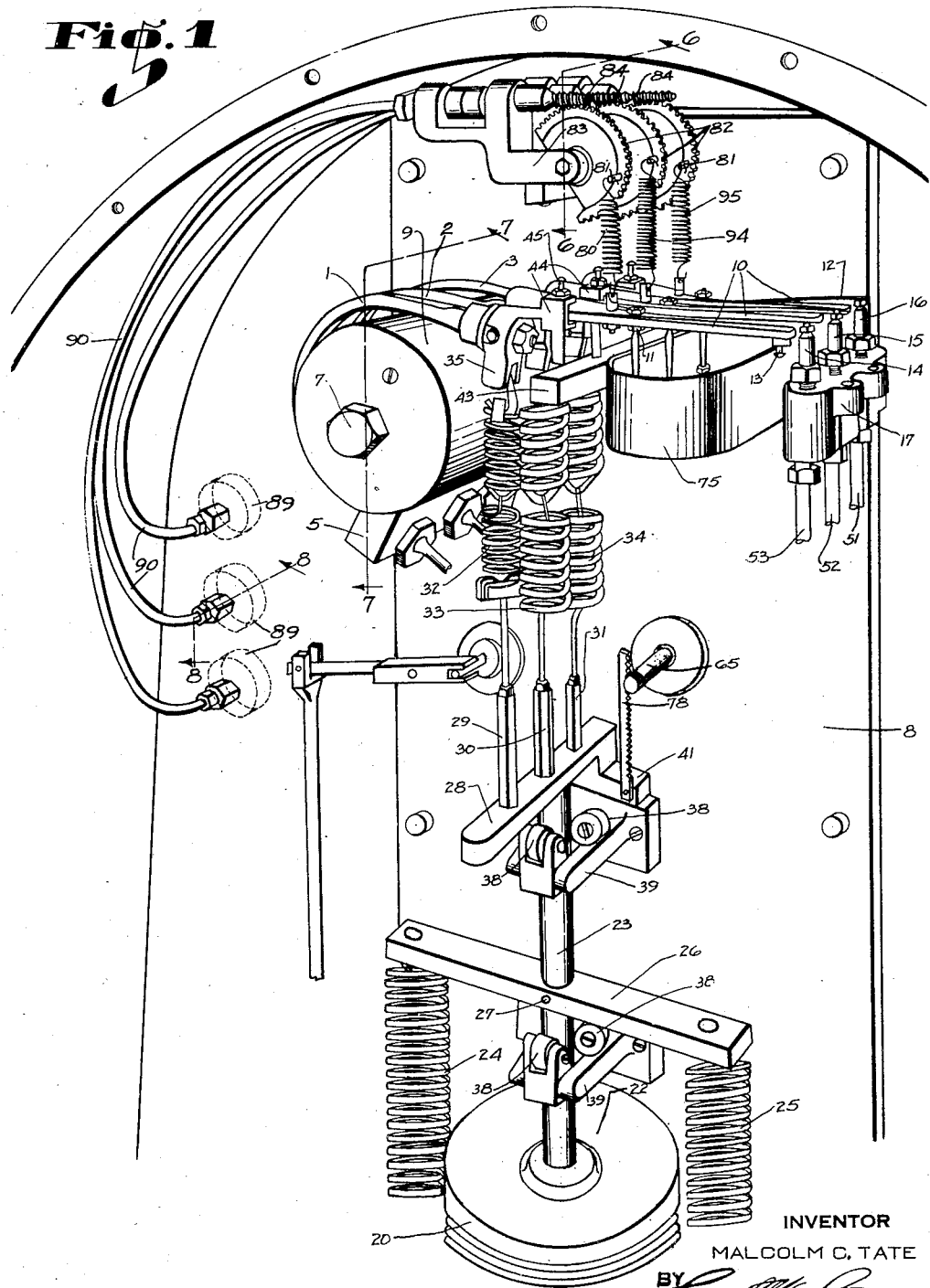
Fig. 1 is a fragmentary perspective of the rear side of my improved multiple load range responsive means and the zero adjusting mechanism thereof.
Figure 3:
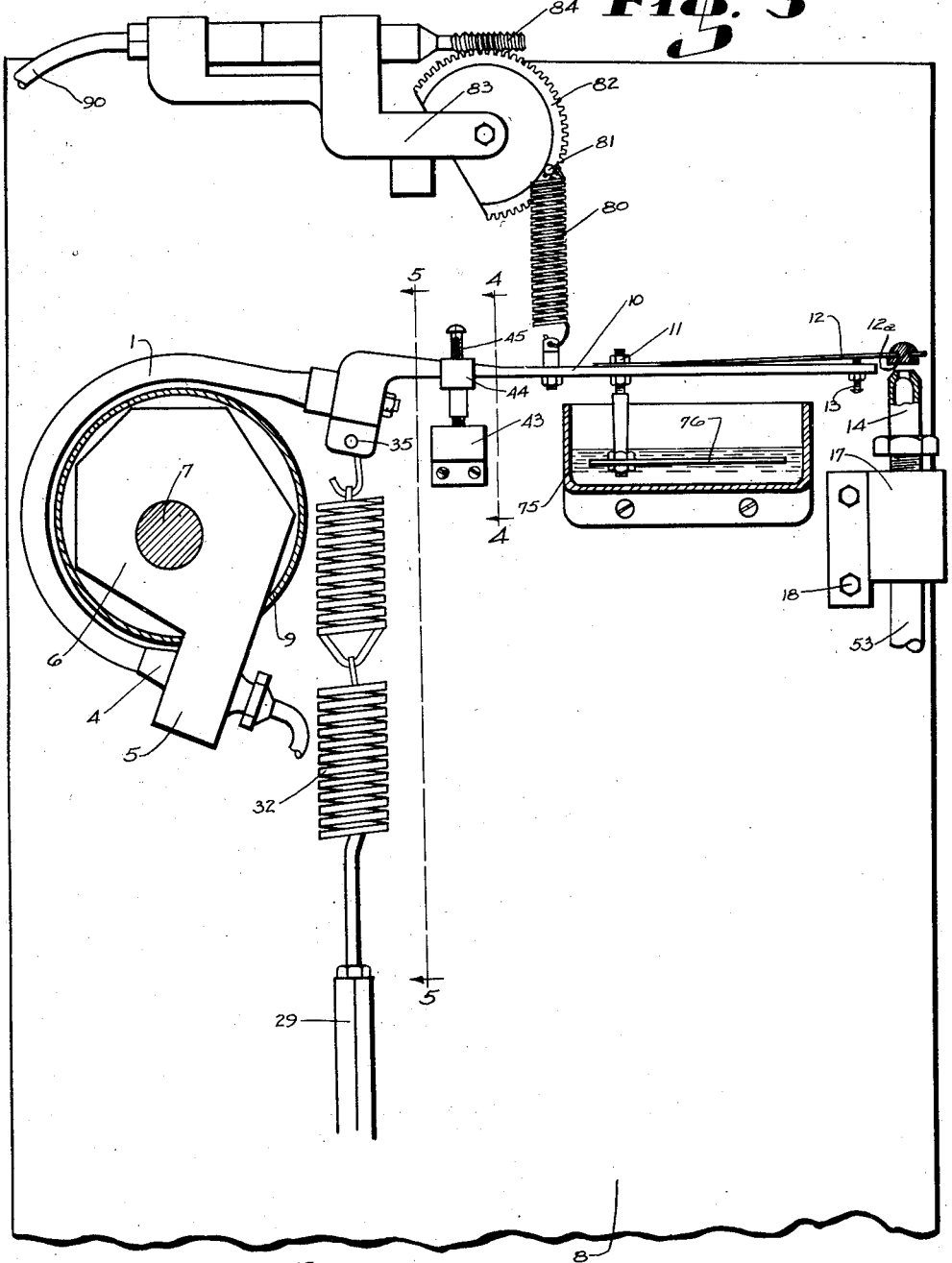
Fig. 3 is an enlarged sectional view showing my improved zero position adjusting means and the mechanism for supporting the multiple load range tubes in a compact and convenient manner.

In the particular embodiment of the invention illustrated herein, I have shown in Fig. 1 a plurality of load responsive elements specifically in the form of Bourdon tubes 1, 2 and 3 representing three load ranges. The lower fixed ends 4 of these tubes are secured in individual flanges 5 formed respectively on relatively large and heavy separate metal blocks 6, these blocks being held together by a bolt 7 which is threaded into a vertical base plate 8, Figs. 7 and 5. A suitable cylindrical cover 9, Figs. 1 and 2, slips over the blocks 6 and is provided with a slot through which blocks 6 extend. Each of the free ends of tubes 1, 2 and 3 are provided with relatively stiff arms 10, Fig. 3, which, in turn, are secured at 11 to thin flexible baffle plates 12 whose respective elevations relative to arms 10 may be adjusted by screws 13. The baffle plates 12 of the respective Bourdon tubes have small flat discs 12a riveted to the underside of the plates so as to overlie air jets 14, 15 and 16, these jets being rigidly supported in a stationary position in a jet supporting bracket 17 which, as shown in Fig. 3, is secured at 18 to the base plate 8. The Bourdon tubes are connected to any desired source of pressure or other medium whose condition is to be controlled or measured and which in the case of materials testing machines may be a hydraulic loading cylinder or a hydraulic support of the Emery type machine such as is generally illustrated in Emery Patent 1,848,468.

Figure 5:
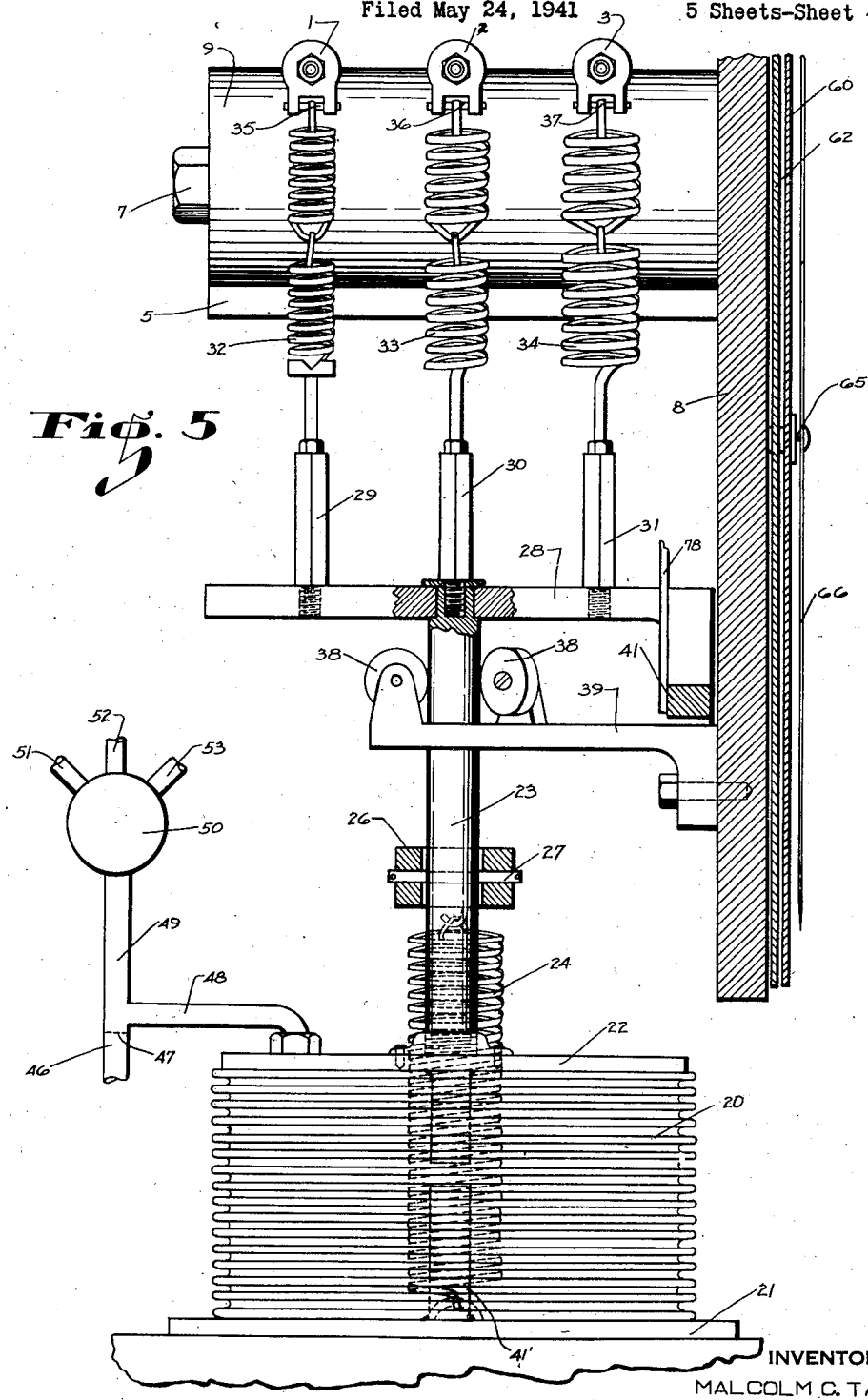
Fig. 5 is a section taken substantially on the line 5—5 of Fig. 3 with the lower set of guide rollers omitted for clarity.

The expanding force of the Bourdon tubes is resisted, Figs. 1 and 5, by an air controlled servo-motor 20 preferably in the form of a metal Sylphon bellows whose lower end is rigidly supported upon a suitable base 21 and whose upper movable end 22 is secured to an operating rod 23 to which a pair of springs 24 and 25 are connected through a cross-bar 26 provided with a pivotal connection 27 to permit equalization of the action of springs 24 and 25. Rod 23 is, in turn, rigidly connected to an arm 28 which carries a series of studs 29, 30 and 31 for supporting the lower ends of multiple load range springs 32, 33 and 34.

Figure 4:
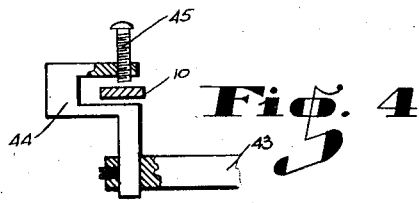
Fig. 4 is a transverse section taken on the line 4—4 of Fig. 3.

These springs are preferably of the well-known iso-elastic type referred to in my said patent and copending application and they respectively have different degrees of flexibility depending upon the desired load ranges to be represented by each. The upper ends of these springs are connected by suitable pins and clevises 35, 36 and 37 to the free ends of the Bourdon tubes 1, 2 and 3. The shaft 23 is suitably guided at upper and lower points by two sets of guide wheel structures 38, each set having preferably three wheels, Fig. 5, mounted upon stationary arms 39 secured to base plate 8. Downward movement of the bellows 20 and the springs 24 and 25 is limited by stops 41' formed within the bellows while upward movement is limited by the top of the bellows engaging the under side of the lower guide wheel structure 38. A limit stop for the free ends of the Bourdon tubes is provided, Fig. 3, by means of a horizontal bracket 43 vertically adjustably secured in base plate 8 and carrying a U-shaped limit member 44, Fig. 4, one for each baffle arm 10 which extends through the U-space of stops 44. Adjustable screws 45 determine the extent of vertical movement of the baffle arms.

The foregoing structural side by side arrangement of the Bourdon tubes wherein they lie in parallel planes as well as being preferably specifically placed with their centers of curvature substantially coaxial or in alignment with each other is conducive not only to an extremely compact apparatus but also one that is particularly simple and direct in its cooperative relation to the common servo-motor 20.

Control of the servo-motor 20 by the air jets and baffles is the same as disclosed in my said copending application and briefly comprises a suitable supply of constant air pressure admitted to a pipe 46 having an orifice 47 which communicates through a flexible pipe 48 with the interior of bellows 20 and also through a pipe 49 with a load range selecting valve 50. This selecting valve, as shown in Fig. 2 has three outlets 51, 52 and 53 adapted to be selectively connected to pipe 49 by rotation of the valve core 54. This core is connected by an arm 55 and link 56 to another arm 57 which is pivotally connected at 58 to the back side of base plate 8. The inner end of arm 57 has a pin and slot connection 59 with a dial mask 60, Fig. 2a. This mask has a series of equally spaced openings 61 preferably in the form of radial slots overlying a graduated dial 62 which is held in a fixed position by screws 63 to the base plate 8. On the other hand, the dial mask 60 is suitably journalled on a center stud 64 in which a shaft 65 of a load indicating pointer 66 is journalled. A slot 67 is formed in the graduated dial 62 to permit pin 59 to extend therethrough and to have movement in an arcuate direction during adjustment of the mask.

The graduated dial 62 is provided with three load ranges respectively represented at 70, 71 and 72. Each range is provided with its own zero position which is equally spaced from the others as shown in Fig. 2. The first load range 70 has a unit spacing representing 100 pounds as indicated by the successive markings 100, 200 and 300, etc.; the second load range having the same unit spacing but representing 500 pounds per unit as indicated by the successive markings 500, 1000, 1500, etc.; and the third load range also having the same unit spacing but representing 2500 pounds per unit as indicated by successive markings 2500, 5000, 7500, etc. The Bourdon tubes 1, 2 and 3 and their springs 32, 33 and 34 correspond respectively to the sets of load graduations 70, 71 and 72. To render the load ranges individually operative it is only necessary for the operator to manually shift, Fig. 2, a single handle 74 secured to the end of the selecting valve core 54. When the core 54 is in the position as shown high load range jet 16 is placed in communication with air supply pipe 49 and the other air jets are inoperative even though all three of the Bourdon tubes have simultaneous fluid connection with the testing machine or other apparatus for producing a force or condition to be measured in the Bourdon tubes, it being understood as previously stated that in connection with materials testing machines fluid pressure may be supplied to the Bourdon tubes either directly from the main loading cylinder or from a hydraulic support in the event that the machine is of the Emery type such as disclosed in Emery Patent No. 1,848,468. Or, if desired, a pendulum machine may be employed, all in the manner illustrated in my said patent and copending application. When the pressure to be weighed increases, the Bourdon tube of the selected range will raise its baffle 12 away from its jet such as 14 thereby allowing air pressure within pipe 51 to discharge through the jet opening at a momentarily increased rate and accordingly cause a reduction of pressure in said pipe. This reduced pressure is transmitted directly to Sylphon bellows 20 through pipes 49 and 48 whereupon springs 24 and 25 pull downwardly on rod 23 to increase the tension on springs 34 and accordingly return the baffle 12 substantially to its normal position relative to the jet 14. This re-establishes a stabilized relationship between the reduced air pressure in Sylphon bellows 20 and the force of springs 24 and 25 so that the baffle remains in its normal relation to the jet unless a further change of pressure occurs in the Bourdon tubes. Conversely, when the loading pressure decreases the Bourdon tube tends to contract thereby moving baffle 12 toward the jet so that the pressure in pipe 51 increases and accordingly increases the pressure in Sylphon bellows 20 which moves rod 23 upwardly to reduce the force of spring 34 thereby allowing baffle 12 to rise to its normal position relative to the jet orifice. This re-establishes a balanced relation. The operation for the other load ranges is identical, it being understood that the operator merely shifts valve core 54 so as to select the air jet of the load range that is to be rendered operative.

During the foregoing selection of load range, the dial mask 60 will be angularly shifted so that only the graduations of a selected load range will be visible to the operator through the slots 61.

To insure stability of movement of the jet baffles a relatively freely operating dash pot is provided having an open chamber 75 in which a series of baffles 76 are disposed, one for each Bourdon tube arm 10. It will of course be understood that movement of servo-motor 20 causes rotation of load indicating hand 66, Figs. 1 and 2a, through the medium of a suitable rack and pinion 78, the rack being suitably secured to a bracket 41 formed as a part of arm 28.

To adjust the zero position relationship between the pointer 66 and the series of successive zero graduations, I have provided improved means for individually varying the relation between the jets and their respective baffles, this being accomplished herein by specifically varying the tension of the individual sets of springs 32, 33 and 34 and thereby cause a variation of the jet-baffle relation to the extent necessary to cause pointer 66 to have a correct initial position for its selected load range. This means comprises, as shown in Figs. 1 and 3, a relatively fine spring 80 whose elongation per unit of force is relatively large and which is connected at its lower end to Bourdon tube 1 and at its upper end to a pin 81 formed on a gear segment 82. This gear is journalled in a suitable bracket 83 while a worm 84 is also journalled in said bracket and adapted to be rotated through a flexible cable or wire 85, Fig. 8, from the front of the machine by a knob 89. A suitable flexible housing 90 encloses the flexible cable 85. To insure sensitive "feel" and positive control by the operator of the flexible cable 85, a friction pin 91 engages a rigid shaft 92 of knob 89. This pin not only holds the cable in any adjusted position, but also minimizes the possibility of excessive torsion in the flexible wire 85 during rotative adjustment thereof such as would occur if the friction pin were near the worm 84 because in this event the entire length of the flexible cable would be subjected to torsion sufficient to overcome the friction at its remote end. However, in my improved arrangement the friction pin 91 causes a major portion of the friction to be present immediately adjacent the knob 89 and hence the operator does not feel any apparent looseness or indecisive response of the adjusting cable 85.

In the operation of the zero adjusting device the operator merely rotates knob 89 in whichever direction it may be necessary to increase or decrease the tension of spring 80 thereby to add or subtract a very small force to the Bourdon tube arm 10 and accordingly momentarily slightly vary the spacing between baffle 12 and its jet. Hence the air jet pressure will be slightly varied until the servo-motor moves to re-establish the original jet baffle relationship, but this movement will be accompanied by rotation of the load indicating hand 66. The operator can observe whether the hand 66 comes to rest precisely upon its intended zero position and if it does not, then further adjustment of the tension of spring 80 can be made. Each load range may be similarly adjusted by varying the tension of their respective springs 94 and 95. Inasmuch as the structure and mode of operation for these other zero position adjusting means is the same as that above described further description is not necessary and the remaining corresponding elements are given the same reference numbers as those shown in Fig. 3. In the foregoing zero adjustments the fine springs 80, 94 and 95 afford the equivalent of a gear reducing action or a micro-adjustment of the jet-baffle relation.

From the foregoing disclosure, it is seen that I have provided an extremely simple, compact, rugged and yet sensitive and accurate arrangement whereby a multiplicity of load range responsive means may be built into a single machine and at the same time a highly sensitive and accurate zero position adjusting mechanism is provided for each load range whereby the zero positions may be adjusted independently of each other without any possibility that the adjustment of one load range will interfere with or alter the zero positions of the other load ranges. This zero adjusting mechanism is direct and positive in its action and is simple and easily accessible for purposes of inspection and maintenance.

It will of course be understood that various changes in details of construction and arrangement of parts may be made by those skilled in the art without departing from the spirit of the invention as set forth in the appended claims.

I claim:

1. In combination, a plurality of Bourdon tubes, means for supporting said tubes with their centers of curvature substantially coaxial, a source of power commonly connected to the free ends of said tubes for resisting movement thereof, a plurality of extensible means respectively interposed between and connected to said source of power and to said Bourdon tubes, said extensible means being disposed in side by side relation to each other and being of different extensibility per unit of force applied thereto thereby to provide different load ranges, mechanism operated by said power source, and means for controlling said power source in accordance with movement of any one of said tubes.

2. In combination, a plurality of selectively operable Bourdon tubes, means for supporting said tubes in parallel planes, an air controlled servo-motor, sets of springs respectively connecting the free ends of said tubes with said servo-motor, said sets of springs being disposed in side by side relation to each other, means for controlling said servo-motor by movement of the free ends of said tubes, means for rendering said servo-motor operable in accordance with movement of a selected one of said tubes, and indicating means operated by said servo-motor.

3. In combination, a movable member responsive to a predetermined condition, a spring connected to said responsive member, power control means connected to said spring for resisting movement of said member, means responsive to movement of said member for controlling said power means, adjustable extensible means also connected to said responsive member and adapted to apply a variable force thereto so as to effect a predetermined starting position of said power means, and indicating means operated by said power control means.

4. In combination, a member responsive to a predetermined condition, a spring connected to said responsive member, a servo-motor connected to said spring to transmit force therethrough for resisting movement of said member, means for controlling said servo-motor in accordance with movement of said responsive member, means for adjusting the initial position of said servo-motor including a relatively fine spring connected to said responsive member for imparting a supplemental spring force thereto and means for varying the tension of said fine springs, and mechanism operated by said servo-motor.

5. In combination, a Bourdon tube responsive to a condition of operation, a servo-motor for resisting movement of the free end of said tube, means for controlling said servo-motor including air jet and baffle elements controlled by movement of said free end, adjustable extensible means connected to one of said elements for also controlling the jet-baffle relation thereby to determine the initial position of said servo-motor, and mechanism operated by said servo-motor.

6. In combination, a plurality of Bourdon tubes operative for different load ranges, means for supporting said tubes and the free end of each tube having a baffle and an air jet therefor, an air controlled servo-motor, springs connecting said servo-motor with each of said Bourdon tubes, said springs having different degrees of flexibility in accordance with predetermined load ranges, means for selecting any one of said air jets and baffles to control said servo-motor by the Bourdon tube which is associated with the selected jet-baffle, individually adjustable springs operatively connected to the free ends of said tubes so as to impose a force thereon in opposition to said other springs thereby to provide a micro-adjustment of the jet-baffle relation for any selected tube and accordingly control the zero position of the servo-motor for a selected load range, and mechanism operated by said servo-motor.

7. In combination, a pressure responsive Bourdon tube supported at one end while its other end is adapted to have free movement, baffle and air jet elements one of which is supported by the free end of said tube for movement therewith, an air operated servo-motor controlled by said air jet and baffle, a spring connecting said servo-motor with the free end of said tube whereby said servo-motor is adapted to transmit a force through said spring to the free end of said tube to resist movement of said free end in response to variations of pressure in the tube, an adjustable spring operatively connected to the free end of said tube so as to impose a force thereon in opposition to said other spring thereby to provide a micro-adjustment of the jet-baffle relation and accordingly control the zero position of the servo-motor, and mechanism operated by said servo-motor.

8. In combination, a plurality of movable force responsive members operative for different load ranges, a plurality of extensible means respectively connected to said members to individually resist movement thereof, and each of said extensible means being of different degrees of flexibility for different load ranges, a servo-motor connected to said extensible means to transmit a force therethrough for resisting movement of said responsive members, a plurality of sets of air jet and baffle elements one set being for each of said responsive members, one of said elements being connected to its respective responsive member whereby movement thereof causes relative movement between its jet and baffle, means whereby said jets and baffles control operation of said servo-motor, means for relatively adjusting the relationship between any given jet and baffle independently of the relationship between any other jet and its baffle while maintaining connection of said servo-motor to all of said extensible means whereby the zero position of any given load range may be determined independently of the zero position of any other load range, and mechanism operated by said servo-motor.

9. In combination, movable force responsive means, a spring connected to said responsive means, a servo-motor connected to said spring for resisting movement of said force responsive means, means for controlling said servo-motor including air jet and baffle elements controlled by movement of said force responsive means, a second spring also connected to said force responsive means to act thereon simultaneously with said other spring, and means for varying the tension of said second spring to set the initial jet-baffle relation and thereby determine the initial zero position of said servo-motor, said latter means including a worm and worm gear to which said second spring is connected whereby upon rotation of the worm the second spring is extended or contracted as desired to vary the air jet and baffle relation.

MALCOLM C. TATE.